(12) United States Patent
Vickers

(10) Patent No.: US 9,795,903 B2
(45) Date of Patent: Oct. 24, 2017

(54) INDUSTRIAL FILTRATION APPARATUS

(71) Applicant: Toyota Motor Engineering & Manufacturing North America, Inc., Erlanger, KY (US)

(72) Inventor: George Thomas Vickers, Hurricane, WV (US)

(73) Assignee: Toyota Motor Engineering and Manufacturing North America, Inc., Erlanger, KY (US)

(*) Notice: Subject to any disclaimer, the term of this patent is extended or adjusted under 35 U.S.C. 154(b) by 273 days.

(21) Appl. No.: 14/177,217

(22) Filed: Feb. 10, 2014

(65) Prior Publication Data

US 2015/0224427 A1 Aug. 13, 2015

(51) Int. Cl.
*B01D 29/05* (2006.01)
*B01D 29/90* (2006.01)

(52) U.S. Cl.
CPC ............. *B01D 29/90* (2013.01); *B01D 29/05* (2013.01); *B01D 2201/265* (2013.01); *B01D 2221/08* (2013.01)

(58) Field of Classification Search
CPC ...... B01D 29/05; B01D 29/23; B01D 29/232; B01D 29/30; B01D 29/35; B01D 29/52; B01D 29/96; B01D 46/003; B01D 46/0004; B01D 2201/10; B01D 2201/26; B01D 2201/265; B01D 29/0095; B01D 29/03; B01D 29/0004; B01D 29/0013; B01D 29/56; B01D 29/9096; B01D 2221/08
See application file for complete search history.

(56) References Cited

U.S. PATENT DOCUMENTS

| | | | |
|---|---|---|---|
| 5,104,529 A | 4/1992 | Becker | |
| 5,707,535 A * | 1/1998 | Harris | B01D 29/23 210/241 |
| 6,004,470 A | 12/1999 | Abril | |
| 8,261,918 B1 * | 9/2012 | Powell | B01D 29/27 210/241 |
| 2006/0011561 A1 * | 1/2006 | Brouillard | B01D 29/23 210/767 |

OTHER PUBLICATIONS

"TEXTILENE Trademark Information" Twitchell Corporation ( ca. 1943).*
CECOR, "Cart Options" printed from http://www.cecor.net/PDF_CATALOG/Cart_Options.pdf on Feb. 10, 2014 in 1 pg.

* cited by examiner

*Primary Examiner* — Lucas Stelling
(74) *Attorney, Agent, or Firm* — Christopher G. Darrow; Darrow Mustafa PC

(57) ABSTRACT

An apparatus for filtering an industrial slurry, a non-suspended mixture of solid particulate matter and liquid produced by an industrial process, is disclosed. A method and system for filtering an industrial slurry and recycling liquid filtrate are additionally disclosed. One example of an apparatus for filtering an industrial slurry can include a receptacle, a false bottom disposed within the receptacle and containing an effluent exit, and a filter disposed within the effluent exit.

12 Claims, 3 Drawing Sheets

INDUSTRIAL FILTRATION APPARATUS

BACKGROUND

The present disclosure relates to an apparatus for removing solid particulate matter from liquid so that the liquid may be reused.

Many industrial processes which utilize liquids produce dense slurries in which those liquids are in admixture with solid particulate matter. For example, machining of metals typically requires a fluid coolant to be applied at the surface of the metal being machined in order to dissipate heat. A side product of the process is a dense mixture of coolant and swarf, or metal shavings. Material efficiency of such processes is improved if the solid particulate matter can be removed so that the liquid can be reused. One approach to achieve this result is filtration. However filter fouling, plugging of the filter with solid particulates, can greatly increase required filtration times.

SUMMARY

Apparatus, systems, and methods for filtering industrial slurries utilize spatially separate slurry deposit sites and filtration sites on pitched surfaces. An industrial slurry, such as metal swarf mixed with coolant, is deposited at a higher elevation deposit site where liquid seeps from the slurry toward the lower elevation filtration site. Because the preponderance of solid particulates in the slurry need never contact a filter located at the filtration site, filter fouling is slowed and filter performance improved.

One implementation of the described embodiments discloses a filtration apparatus comprising a pitched surface. The pitched surface includes a slurry deposit site which is operable to receive an industrial slurry and is disposed on the pitched surface at a first elevation and a filtration site operable to filter seepage from the industrial slurry and disposed on the pitched surface at a second elevation which is lower than the first elevation.

Another implementation of the described embodiments discloses a system for recycling liquid from an industrial slurry comprising a filtration apparatus operable to remove solid particulate matter from liquid in an industrial slurry and a collection unit. The filtration apparatus includes a receptacle, a pitched surface forming a false bottom disposed within the receptacle, and a drainage port disposed at a position on the receptacle located below the false bottom. The false bottom has a slurry deposit site, disposed at a first elevation on the pitched surface, operable to receive an industrial slurry, a filtration site, disposed at a second elevation on the pitched surface lower than the first elevation, operable to filter seepage from the industrial slurry, and a drainage port disposed at a position on the receptacle located below the false bottom. The collection unit is operable to receive liquid from the drainage port.

Another implementation of the described embodiments discloses a method for recycling liquid from an industrial slurry comprising placing the industrial slurry in a filtration apparatus. The filtration apparatus includes a receptacle, a pitched surface forming a false bottom disposed within the receptacle, and a drainage port disposed at a location on the receptacle below the false bottom. The pitched surface comprises a slurry deposit site, disposed at a first elevation on the pitched surface, operable to receive the industrial slurry and a filtration site, disposed at a second elevation on the pitched surface which is lower than the first elevation, operable to filter seepage from the industrial slurry. The method additionally comprises processing seepage from the industrial slurry through the filtration site to produce filtered liquid and dispensing the filtered liquid from the drainage port to a collection unit.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

The present disclosure relates to an apparatus for filtering an industrial slurry. The disclosure also relates to a system and a method for filtering an industrial slurry and recycling the filtered liquid.

As used herein, the phrase "industrial slurry" refers to a mixture of liquid and solid particulate matter produced by an industrial process in which the solid particulate matter is not in stable suspension in the liquid. The liquid can, but need not necessarily be, aqueous. Similarly, limitations of particle shape or size, slurry density, or mass ratio of solid particulate matter to liquid are not implied. In some instances however, effectiveness of the apparatus, method, and system may be superior with respect to an industrial slurry in which the mass ratio of solid particulate matter to liquid is greater than 1:1.

In some instances, the solid particulate matter can be a waste product or contaminant and the liquid can be a material that is reusable once filtered. In some particular variations, the industrial slurry can comprise a mixture of metal swarf and coolant, such as would be produced by a metal machining process. Such metal swarf can include metallic particulate matter of a wide variety of shapes and sizes, including but not limited to ribbons, turnings, filings, and chips. In such variations, metal swarf can include metal particulates of various grades of steel, of aluminum, or of any other metal.

Figure 1:
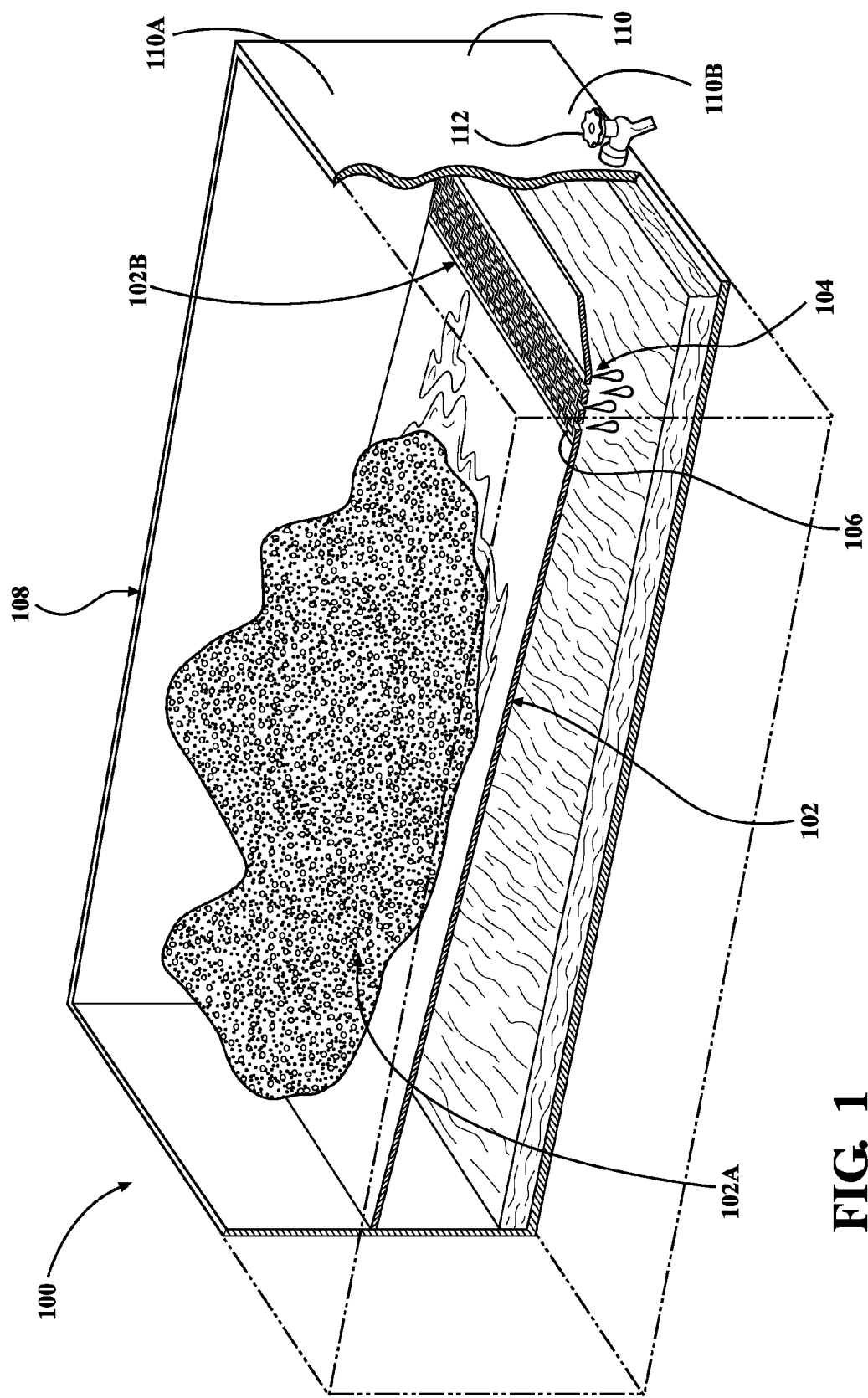
FIG. 1 is a partially transparent perspective view of a coolant filtration apparatus.

Referring now to FIG. 1, a perspective view of a filtration apparatus 100 demonstrates its features in accordance with the present disclosure. Filtration apparatus 100 includes a pitched surface 102. The term "pitched" as used herein means that the pitched surface is not parallel to the ground. The phrase "pitched surface" thus indicates that at least a portion of the pitched surface 102 must be non-parallel relative to the ground when filtration apparatus 100 is oriented for use. Thus, pitched surface 102 can comprise a planar surface which is not parallel to the ground, a plurality of planar regions at least one of which is not parallel to the ground, a curvilinear surface, or a combination of the aforementioned. In instances where "the ground" does not provide a clear frame of reference, the phrase "pitched surface" can alternatively refer to a surface which is not entirely orthogonal to a primary applicable gravitational field vector.

Pitched surface 102 further comprises slurry deposit site 102A which can stably support a mass of industrial slurry and, in particular, can stably support the solid particulate matter portion of industrial slurry. Pitched surface 102 also comprises a filtration site 102B which is located at a distance from slurry deposit site 102A and at a lower elevation than slurry deposit site 102A on pitched surface 102 when apparatus 100 is oriented for use. In general, slurry deposit site 102A will be disposed on pitched surface 102 at a first elevation and filtration site 102B will be disposed on pitched surface 102 at a second elevation which is lower than the first elevation. It should be noted that the first elevation 102A, the second elevation 102B, or both separately can include one or more similar elevations, for example if the location of the first elevation 102A is also pitched.

In some instances filtration site 102B can be an effluent exit 104, an aperture in pitched surface 102 through which liquid may flow. In such instances, a filter 106 can be disposed within effluent exit 104 such that any liquid passing through effluent exit 104 will pass through filter 106. In instances wherein filtration site 102B comprises filter 106 disposed within effluent exit 104, filter 106 can be supported within effluent exit 104 by any suitable means. For example, filter 106 can be sandwiched between two steel mesh elements supported by the perimeter of effluent exit 104.

In other instances, filtration site 102B can include filter 106 which is disposed on pitched surface 102 without effluent exit 104 such that liquid flowing from slurry deposit site 102A to filtration site 102B passes through filter 106 and continues flowing on pitched surface 102.

In some particular variations, apparatus 100 can include receptacle 108, comprising at least one side wall 110. In some such variations, pitched surface 102 can comprise the bottom of receptacle 108. In other such variations, pitched surface 102 can comprise a false bottom disposed within receptacle 108, as is the case in the example of FIG. 1. In the example of FIG. 1, receptacle 108 is an open-faced, hollow rectangular prism comprising four side walls and a bottom wall. A facing side wall and a portion of an adjacent side wall are displayed transparently to enable a view of the interior of filtration apparatus 100. In different variations, receptacle 108 could comprise any suitable structure such as a sphere-like structure comprising a single side wall, or any other at least partially hollow three-dimensional shape.

In variations in which pitched surface 102 comprises a false bottom disposed within receptacle 108, pitched surface 102 can be positioned at a distance above the bottom of receptacle 108. As used herein, the "bottom" of receptacle 108 refers to a portion of receptacle 108 that is located nearest the ground when apparatus 100 is oriented for use. In the present example, pitched surface 102 comprises two planar surfaces. In different variations, as mentioned above, pitched surface 102 could consist of a single planar surface, more than two planar surfaces, at least one non-planar surface such as a curvilinear surface, or any combination of the aforementioned.

In the example of FIG. 1, effluent exit 104 is located at an elevational minimum in pitched surface 102. As used herein, an "elevational minimum" is a region of pitched surface 102 which is located closer to the ground than are adjacent regions of pitched surface 102 when apparatus 100 is oriented for use.

Filter 106 can comprise any suitable filtration media, such as metallic, magnetic, electrostatic, cellulose-based, or other polymer-based. In some instances, filter 106 can comprise a synthetic polymeric filtration medium such as Flotrend Poly-2004 or NW6, a non-woven, 6 ounce weight, polypropylene fabric.

In the present example, side wall 110 can be considered to consist of two portions: upper portion 110A and lower portion 110B. Upper portion 110A comprises a portion of sidewall 110 which is at a higher elevation than pitched surface 102 when apparatus 100 is oriented for use. Lower portion 110B comprises a portion of sidewall 110 which is at a lower elevation than pitched surface 102 when apparatus 100 is oriented for use. Apparatus 100 can optionally include a drainage port 112 disposed in lower portion 110B of sidewall 110. In some variations, drainage port 112 can be disposed in the bottom, or in close proximity to the bottom, of receptacle 108.

Because slurry deposit site 102A is disposed on pitched surface 102 at a first elevation which is higher than the second elevation at which filtration site 102B is disposed, liquid can seep out of a deposited industrial slurry and flow toward filtration site 102B. Such seeping liquid, also referred to as "seepage", will tend to have lower solid particulate matter content as compared to the industrial slurry. In effect, solid particulate matter contained in the industrial slurry can act as a sort of pre-filter.

As a result, filtration of the seepage will entail less solid particulate matter entrainment in filter 106 and thereby extend the duration of filter effectiveness prior to fouling compared to direct filtration of industrial slurry. The design additionally allows for easy removal of filter 106 for regeneration or replacement, even during filtration, since filter 106 comprises only a portion of pitched surface 102 and is generally not in direct contact with industrial slurry.

Figure 2:
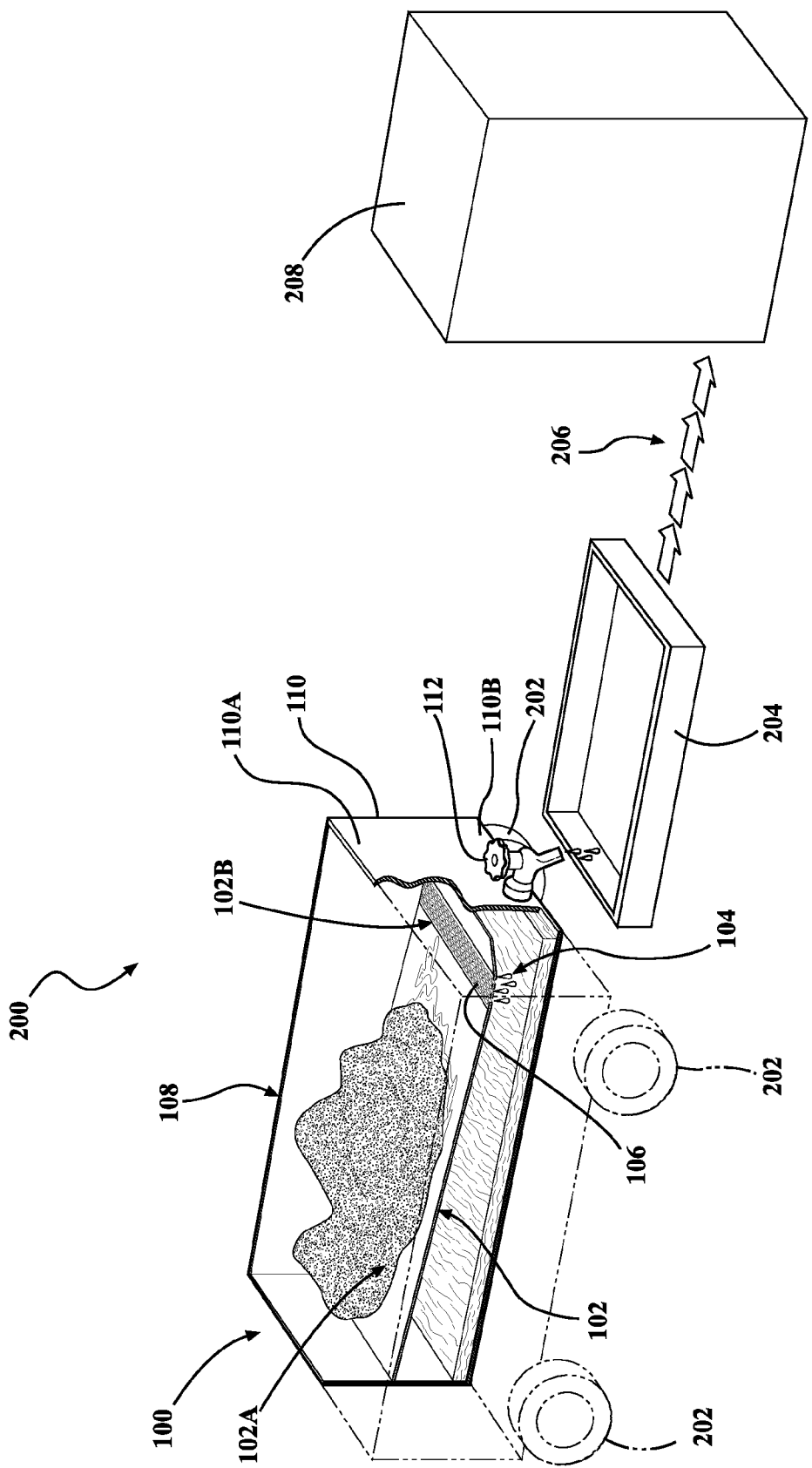
FIG. 2 is a perspective view of a system for recycling machining coolant, including the apparatus of FIG. 1.

A system 200 for recycling liquid from an industrial slurry is illustrated in FIG. 2. System 200 generally includes a filtration apparatus 100 of the type shown in FIG. 1 and described above. Filtration apparatus 100 can include transport means 202 operable to facilitate transport of filtration apparatus 100 to various locations within an industrial setting. Filtration apparatus 100 can include a drainage port 112, operable to drain filtered liquid from apparatus 100. Drainage port 112 should be positioned within lower portion 110B of sidewall 110 and/or in the bottom of receptacle 108, and will generally comprise an aperture with reversible closing means. As such, drainage port 112 could comprise an aperture with a stopper, a spigot or other valve, or any other suitable means.

System 200 also includes a collection unit 204 operable to receive liquid from drainage port 112 of filtration apparatus 100. Liquid can be dispensed from drainage port 112 to collection unit 204 by gravitational flow with or without a liquid conduit such as hose or pipe. Alternatively, liquid can be dispensed from drainage port 112 to collection unit 204 with mechanical assistance such as via pump.

In some variations, collection unit 204 can be a temporary storage receptacle for liquid dispensed from drainage port 112. In such variations, the system may additionally include fluid transport means 206 and process entry point 208. As used herein, the phrase "process entry point" can refer to an in-line site of the process which produced industrial slurry, the in-line site being capable of receiving filtered liquid. For example, process entry point 208 can be an in-line coolant tank from which machining coolant is fed to a machining tool. Fluid transport means 206 can comprise any liquid conduit such as hose, pipe, or duct operable to direct filtered liquid from collection unit 204 to process entry point 208 under gravitational or mechanically assisted flow. In other variations of method 200, collection unit 204 can comprise process entry point 208.

Figure 3:
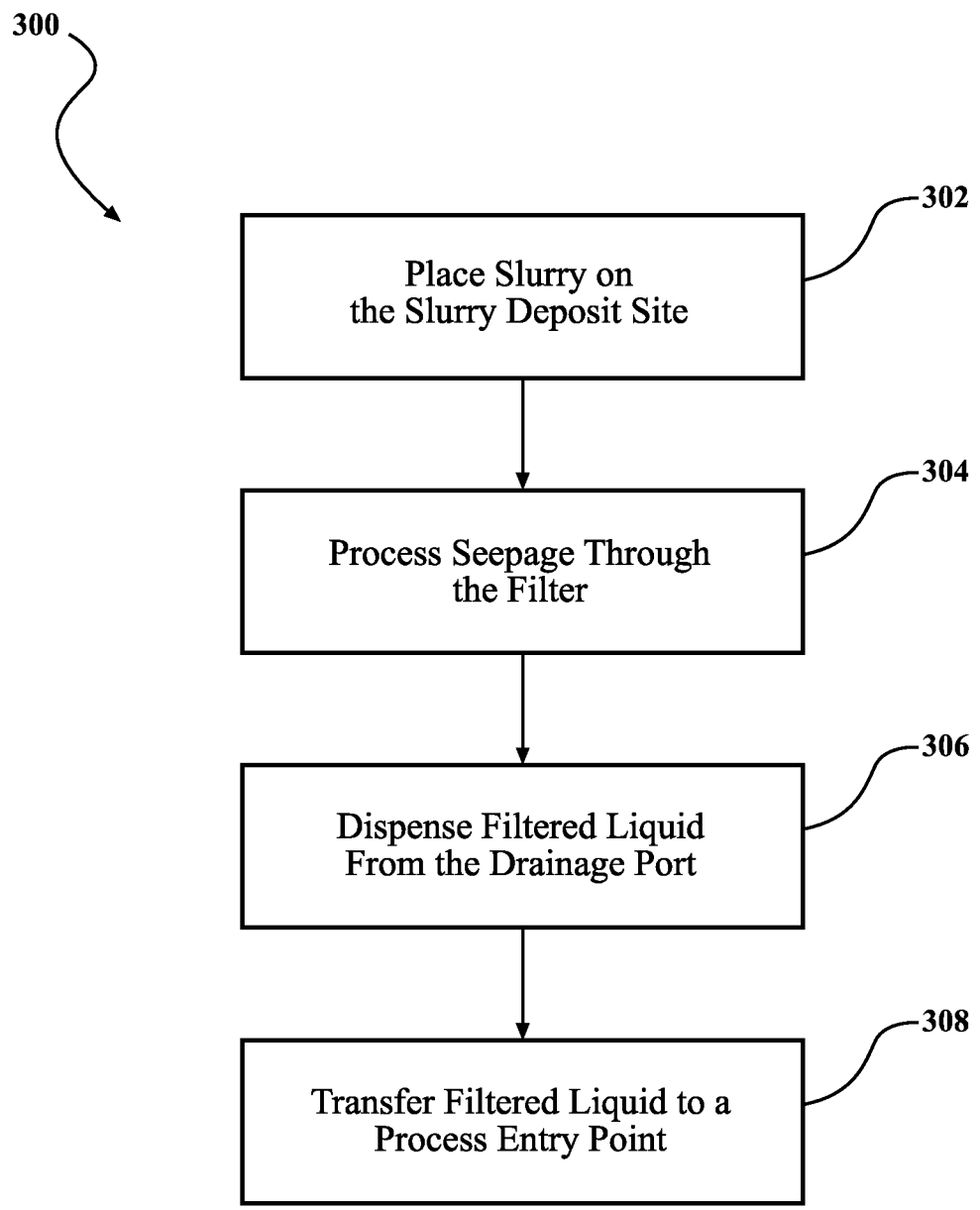
FIG. 3 is a flow-diagram of a method for recycling machining coolant utilizing a system like that of FIG. 2.

A method 300 for recycling liquid from an industrial slurry is schematically shown in FIG. 3. In step 302, industrial slurry is placed in a filtration apparatus 100 including a receptacle 108, a pitched surface 102 forming a false bottom disposed within the receptacle 108, and a drainage port 112 disposed on the receptacle 108 at a location below the false bottom. The pitched surface 102 comprises a slurry deposit site 102A disposed at a first elevation on the pitched surface and operable to receive the industrial slurry and a filtration site 102B disposed at a second elevation on the pitched surface which is lower than the first elevation and operable to filter seepage from the industrial slurry.

In step 304, seepage from industrial slurry is processed through the filtration site 102B disposed at the second elevation on pitched surface 102. In some variations, filtration site 102B will include an effluent exit 104 and a filter 106 disposed within the effluent exit. In such variations, seepage will drop through the effluent exit 104 and pass through filter 106, becoming filtered liquid as it falls to the bottom of receptacle 108.

In step 306 filtered liquid which is produced by step 304 is dispensed from drainage port 112 of filtration apparatus 100 to collection unit 204. As above, collection unit 204 can in different variations be a temporary storage receptacle or a process entry point 208. In variations of method 300 wherein collection unit 204 comprises a temporary storage receptacle, method 300 can include an additional step 308 which comprises transferring filtered liquid from collection unit 204 to process entry point 208. In some such variations, optional step 308 can employ fluid transport means 206 which may comprise any liquid conduit such as hose, pipe, or duct operable to direct filtered liquid from collection unit 204 to process entry point 208 under gravitational or mechanically assisted flow.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A filtration apparatus comprising:
   a plurality of side walls and a horizontal bottom defining an open-faced receptacle having a length and width;
   a false bottom extending between the plurality of side walls across an entirety of a width of the receptacle, and defining a pitched surface with respect to the horizontal bottom, the false bottom having a solid, non-porous slurry deposit site disposed at a first elevation, extending across an entirety of the width of the receptacle and contacting opposing side walls, and configured to receive and support a mass of industrial slurry, and a filtration site disposed at a second elevation lower than the first elevation, the false bottom being disposed within the receptacle and spaced a distance above the horizontal bottom, thereby defining a fluid collection cavity between the horizontal bottom and the false bottom, wherein
   comprises a filter, distinct from the slurry deposit site, the filter extending across an entirety of the width of the receptacle, as defined by the respective side walls, and is configured to filter seepage from the industrial slurry; and
   a drainage port for selectively removing seepage from the fluid collection cavity, the drainage port disposed in a lower portion of one of the plurality of side walls.

2. The filtration apparatus as recited in claim 1, wherein the drainage port is disposed at a position on the side wall located a distance below the false bottom.

3. The filtration apparatus as recited in claim 1, wherein the filter comprises a synthetic polymeric medium.

4. The filtration apparatus as recited in claim 1, wherein the filtration site defines an effluent exit disposed at an elevational minimum in the false bottom.

5. The filtration apparatus as recited in claim 1, wherein the industrial slurry comprises a mixture of coolant and metal shavings.

6. A system for recycling liquid from an industrial slurry comprising:
   a filtration apparatus operable to remove solid particulate matter from liquid in an industrial slurry and including:
      a receptacle including a plurality of sidewalls and a horizontal bottom;
      a false bottom disposed within the receptacle, extending between the plurality of side walls across an entirety of a width of the receptacle, and defining a pitched surface, the false bottom disposed a distance above the horizontal bottom and comprising:
         a solid, non-porous slurry deposit site disposed at a first elevation on the pitched surface, extending across an entirety of the width of the receptacle and contacting opposing side walls, and configured to receive an industrial slurry; and
         a filtration site disposed at a second elevation on the pitched surface lower than the first elevation and configured to filter seepage from the industrial slurry, the filtration site comprising a filter, distinct from the slurry deposit site, the filter extending across an entirety of the width of the false bottom and configured to filter seepage from the industrial slurry;
      a drainage port disposed at a position on the receptacle located below the false bottom; and
   a collection unit distinct from the filtration apparatus and configured to receive liquid from the drainage port.

7. The system as recited in claim 6, wherein the filtration site comprises an effluent exit disposed within the false bottom and the filter is disposed within the effluent exit.

8. The system as recited in claim 6, further comprising:
   transport means configured to enable transportation of the filtration apparatus.

9. The system as recited in claim 8, wherein transport means comprises wheels disposed on the filtration apparatus.

10. The system as recited in claim 6, wherein the drainage port and the collection unit are in fluid communication.

11. The system as recited in claim 6, wherein the collection unit comprises a temporary storage receptacle.

12. The system as recited in claim 6, further comprising a liquid conduit operable to direct liquid from the collection unit to a process entry point.

* * * * *

UNITED STATES PATENT AND TRADEMARK OFFICE
CERTIFICATE OF CORRECTION

PATENT NO. : 9,795,903 B2
APPLICATION NO. : 14/177217
DATED : October 24, 2017
INVENTOR(S) : George Thomas Vickers Page 1 of 1

It is certified that error appears in the above-identified patent and that said Letters Patent is hereby corrected as shown below:

In the Claims

Column 5, Lines 59-60: "wherein comprises" should be -- wherein the filtration site comprises --

Signed and Sealed this
Twenty-sixth Day of December, 2017

Joseph Matal
*Performing the Functions and Duties of the
Under Secretary of Commerce for Intellectual Property and
Director of the United States Patent and Trademark Office*